United States Patent
Lapointe et al.

(10) Patent No.: US 7,940,839 B2
(45) Date of Patent: May 10, 2011

(54) FULLY ADAPTIVE EQUALIZATION FOR HIGH LOSS COMMUNICATIONS CHANNELS

(75) Inventors: Marcel Lapointe, Laval (CA); Albert Vareljian, Folsom, CA (US); Riccardo Badalone, Saint-Lazare (CA)

(73) Assignee: Diablo Technologies Inc., Gatineau, Quebec (CA)

( * ) Notice: Subject to any disclaimer, the term of this patent is extended or adjusted under 35 U.S.C. 154(b) by 333 days.

(21) Appl. No.: 10/597,455

(22) PCT Filed: Jan. 26, 2005

(86) PCT No.: PCT/CA2005/000078
§ 371 (c)(1),
(2), (4) Date: Jul. 10, 2008

(87) PCT Pub. No.: WO2005/071848
PCT Pub. Date: Aug. 4, 2005

(65) Prior Publication Data
US 2008/0260016 A1   Oct. 23, 2008

(51) Int. Cl.
*H03K 5/159* (2006.01)
*H03H 7/30* (2006.01)
(52) U.S. Cl. .................. 375/229; 375/230; 375/232
(58) Field of Classification Search .......... 375/229–236, 375/340, 341
See application file for complete search history.

(56) References Cited

U.S. PATENT DOCUMENTS

| | | | | |
|---|---|---|---|---|
| 4,707,740 A | * | 11/1987 | Stratton | 348/532 |
| 5,086,340 A | * | 2/1992 | Citta et al. | 348/21 |
| 5,966,415 A | * | 10/1999 | Bliss et al. | 375/350 |
| 6,047,026 A | * | 4/2000 | Chao et al. | 375/233 |
| 6,134,279 A | * | 10/2000 | Soichi et al. | 375/341 |
| 6,212,229 B1 | * | 4/2001 | Salinger | 375/224 |
| 6,242,961 B1 | * | 6/2001 | Liu et al. | 327/307 |
| 6,650,698 B1 | * | 11/2003 | Liau et al. | 375/229 |
| 7,130,344 B2 | * | 10/2006 | Xia et al. | 375/233 |
| 2003/0218502 A1 | * | 11/2003 | MacTaggart et al. | 330/254 |
| 2004/0091041 A1 | * | 5/2004 | Shanbhag et al. | 375/234 |
| 2005/0025228 A1 | * | 2/2005 | Stonick et al. | 375/232 |
| 2005/0254566 A1 | * | 11/2005 | Sivadas et al. | 375/229 |

OTHER PUBLICATIONS

Altman, Mike IEEE 802.3ap—Adaptive Tx Equalization, Plenary Week IEEE P802.3ap Task Force Meeting. San Antpnio, TX, USA, Nov. 16-18, 2004.
IEEE P802.3ap Task Force Meeting, Nov. 2004 Plenaty Week, Nov. 16-18, 2004, San Antonio, TX, USA.

* cited by examiner

*Primary Examiner* — David C Payne
*Assistant Examiner* — Linda Wong (57) ABSTRACT

An equalization circuit is disclosed that enables high data rate transmission over high loss communications channels. Also disclosed is a set of functional blocks and update criteria that allow for the equalization function to be adapted for a large variety of different communications channels. A fully continuous adaptive equalizer is used in conjunction with a Decision Feedback Equalizer to fully equalize a large number of communications channels.

21 Claims, 5 Drawing Sheets

FULLY ADAPTIVE EQUALIZATION FOR HIGH LOSS COMMUNICATIONS CHANNELS

FIELD OF THE INVENTION

The present invention relates in general to an apparatus and method for equalizing high loss data channels, specifically printed circuit boards and high performance copper cables.

BACKGROUND OF THE INVENTION

Description of the Related Art

In a typical Serializer/Deserializer (SerDes) application, the biggest challenge is to guarantee that every data bit that is transmitted is correctly received. In the case of backplane transceivers that must operate above 1 Gb/s data rates, the loss and dispersion characteristics of the channel make it so that a certain amount of signal conditioning is required in order to recover the signal at the receiver without error.

Figure 1A:
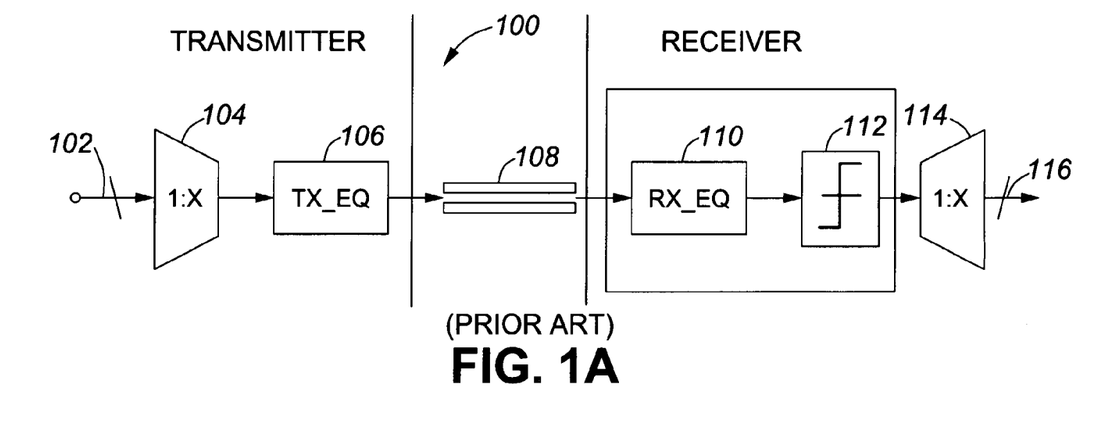
FIG. 1 illustrates simplified block diagrams of prior art Serializers/Deserializers with transmit and receive equalization.

A basic prior art SerDes system 100 is shown in FIG. 1a, where a parallel data stream 102 is serialized by a high-speed multiplexer (MUX) 104 and passed through a pre-emphasis filter 106. The pre-emphasis filter will boost the signal level of high frequency components of the data stream with respect to lower frequency components of the data stream before launching the data into a lossy, dispersive data channel 108. The output of the data channel is passed through a linear equalizer 110, which amplifies the high frequency components of the data stream in relation to the lower frequency components of the data stream. The operation of both pre-emphasis and the linear equalizer is such that the combination of their respective frequency responses corresponds roughly to the inverse function of the channel frequency response. The purpose is to flatten as much as possible the channel frequency response in order to combat the Inter-Symbol Interference (ISI) before detecting the data.

Once the data stream is equalized by means of the above explained pre-emphasis and linear equalization, the slicer 112 performs the bit detection, which is subsequently deserialized by the de-multiplexer (DeMux) block 114. The parallel data 116 is then ready for processing by a local core device.

The pre-emphasis is normally realized with a Finite-Impulse Response (FIR) filter. The number of coefficients (taps) and their resolution (number of bits per coefficient) increases with the severity of the channel loss. For low data rates, the loss is rather small; so two coefficients are generally sufficient. In this case, manual programming of the coefficients is possible due to a manageable number of possible pre-emphasis settings. At the other extreme, when the data rates are very high, a large number of coefficients become necessary; in this case programming them manually is impossible and requires a self adaptive algorithm to converge the equalizer to the optimum solution.

A linear equalizer operates in the frequency domain—as opposed to the pre-emphasis, which operates in the time domain. A linear equalizer requires poles and zeros to be positioned properly in order to compensate correctly for the channel loss. The number of poles and zeros required to equalize the channel will increase with the severity of the channel loss. Getting a low Bit Error Rate (BER) calls for a precisely converged signal-conditioning scheme. This is practically impossible to obtain when more than two poles/zeros need to be configured simultaneously in a manual fashion.

A typical backplane is normally comprised of several links. Each link may be represented by a lossy channel. It is very difficult to isolate two perfectly adjacent channels in such a way as to eliminate any coupling between them. This coupling is called "cross-talk". The frequency response of the cross-talk in a victim link depends primarily on the data spectrum of the aggressor link. But it depends also on the type of coupling between the two links. Most of the time the coupling is capacitive; thus, the high frequency components of the aggressor will pass more easily to the victim. For this reason, aggressive pre-emphasis in the transmitter will increase the amount of high frequency power in the launch data, which will lead to larger amounts of cross-talk to the adjacent victim links. It is therefore possible that increasing the pre-emphasis for a lossy link does not necessarily increase the signal to noise ratio (SNR) at the receiver. On the contrary, increasing the pre-emphasis of an aggressor will substantially increase the amount of cross-talk.

In the case where receive linear equalization is used instead of driver pre-emphasis, the SNR degradation due to cross-talk is very similar. The launch at the transmitter does not have enhanced high frequency components but the coupling between two adjacent links is still present. The linear equalization increases the high frequency components in the receiver, and does not discriminate between signal power and noise power. Overall, assuming the same response for the driver pre-emphasis and the receive linear equalizer, the signal conditioning is roughly the same, resulting in the same impact on the SNR at the receive equalizer output. In summary, even with a highly effective adaptive process to adjust the pre-emphasis and/or linear equalization, the system SNR in heavy loss systems may be too severely degraded to recover the data stream with a sufficiently low BER. The problem is aggravated by the increased data rates required by next generation applications and systems.

Figure 1B:
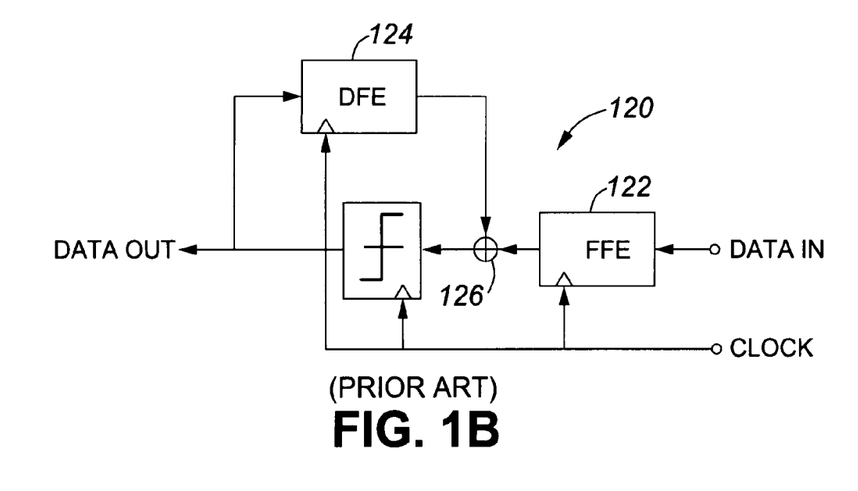

In order to equalize extremely high loss data channels, it becomes necessary to replace the linear equalization scheme 118 with the non-linear scheme 120 depicted in FIG. 1b. In this system, a Feed-Forward Equalizer (FFE) 122 is coupled with a Decision-Feedback Equalizer (DFE) 124, where the DFE is fed by decisions made by slicer 128. The slicer 128, the FFE 122 and the DFE 124 operate at the baud rate, and the outputs of the two equalizers are summed at the summing node 126, where the output of the summing node 126 is the input of the slicer 128.

The FFE is realized with an FIR filter, similar to the realization of the pre-emphasis filter described earlier. It operates in the time domain as opposed to the linear equalizer which operates in the frequency domain. For this reason, it is much easier to find an adaptive process to automatically set the coefficients of an FFE. On the other hand regarding the SNR, there is no advantage of using the FFE over the linear equalizer, since for a similar frequency response, the high frequency components of noise or cross-talk are amplified by the same amount. Moreover, the FFE is realized with a series of sample-and-hold circuits clocked at the baud rate. This type of delay element is much more difficult to realize than a simple latch as used by the pre-emphasis equalizer or the DFE. This represents a disadvantage of the FFE over the linear equalizer. However before concluding, the interaction of the FFE with the DFE must be considered.

The DFE is realized with an FIR filter based on latches and coefficient multipliers, which is very similar to the pre-emphasis realization. There are two differences though. First, a data slicer is inserted at the DFE input to convert the equalized data stream at the FFE output into a decision stream, which is fed in the DFE through the latches. Second, the DFE output response is fed back to the input of the data slicer, which is connected to the FFE output, where the complete equalization takes place. For a similar frequency response, the DFE offers a much cleaner equalization signal than the FFE. The reason is that, while the FFE input is fed with the noisy signal coming from the channel, the DFE operates from the decision stream generated by the aforementioned data slicer, which in theory is absolutely clean. Another advantage of the DFE is that it operates in the time domain hence it is easier to apply an adaptive process to automatically set its coefficients.

In certain conditions the DFE can generate a burst of errors when one or several coefficients are too large. If an incorrect decision is made by the data slicer, and one of the coefficients is very large, it may cause a condition in which the DFE is continuously feeding back an incorrect response at the summing node, which in turn may cause additional incorrect decisions, and so on. A string of like data can often flush out the DFE and correct the situation. In conclusion, for a comparable SNR the DFE equalizer performs better signal conditioning than the FFE or the linear equalization, as long as the range of its co-efficients remains within certain limits. When the limits are exceeded, the risk of getting a burst of errors increases and the SNR may be reduced below acceptable levels. When this happens, the BER is degraded rapidly, which deteriorates its advantage of clean conditioning. Furthermore, since the DFE operates strictly on decisions, it cannot compensate for ISI caused by the pre-cursor(s). The lack of pre-cursor compensation may cause an increase in the BER, which can potentially aggravate the burst error condition, which may lead to unacceptable system performance.

Operating a DFE in combination with an FFE can greatly reduce the risk of burst errors. Both filters can compensate for the post-cursors, where the overall equalization is produced by the sum of both contributions. For example, if $C_1$ is the DFE coefficient that compensates for the first post-cursor, and $B_1$ is the FFE coefficient for the same post-cursor, the sum of B1 and C1 should equal to the value that compensates properly for the first post-cursor. In other words, B1 and C1 can be set in such a way that C1 never goes beyond a certain limit, which may prevent or minimize the probability of burst errors. The FFE can also be configured to compensate for the pre-cursor ISI in addition to the post-cursor ISI.

In some extreme cases, data coding and Forward Error Correction (FEC) techniques are used to reduce the likelihood of burst errors and correct for them when they occur. The problem with using specialized codes and FEC is that the system is required to operate at a higher data rate because error correction requires that a given number of bits be mapped into a higher number of bits. The overhead associated with FEC is typically in the order of 7% but may be as high as 30%. FEC is also undesirable by system designers because it complicates core logic and increases power consumption.

There is a need for an equalization scheme that can address a wide variety of channels. The equalization scheme must be able to provide the benefits of a DFE based equalizer, but must also be robust against burst errors. The equalization scheme must be able to cope with very high channel loss, but also must be highly immune to cross-talk. The equalization scheme must be practical to implement and straightforward to adapt. An equalization scheme that meets all these criteria would be highly valuable in the communications industry because it would allow systems to achieve higher bandwidths without sacrificing performance for reliability, flexibility and ease of use.

SUMMARY OF THE INVENTION

Many communications and computing systems use serial transceivers to interconnect high bandwidth devices. As interconnect speeds continue to climb past 2.5 Gb/s, the data signals that are transmitted across the data channel experience severe loss and dispersion, which creates a large degree of intersymbol interference (ISI). Depending on the specific materials, design, and manufacturing process used in a given channel, the signal degradation can vary greatly, and it is necessary to define an equalization scheme that is both effective and adaptive.

The present invention provides a channel equalization solution which solves the above-described problems by providing an equalization circuit that can be automatically adapted to equalize any given data channel.

A system in accordance with the principles of the present invention includes a transmitter with pre-emphasis and a receiver with an adaptive linear equalizer in combination with an adaptive non-linear decision feedback equalizer (DFE).

One aspect of the present invention is that the transmitter pre-emphasis includes a symbol spaced feed forward equalizer with two (2) coefficients, which correspond to the cursor and pre-cursor.

Another aspect of the present invention is that the linear equalizer has two distinct signal paths. One signal path is a pure gain stage, and can be programmed independently. Another signal path is a pure gain stage coupled with a high-pass filter, where the gain can also be programmed independently.

Another aspect of the present invention is that the DFE has a plurality of symbol spaced coefficients, each of which can be programmed independently.

Another aspect of the present invention is that all the coefficients and various stages of gain are all adapted based on decisions that are made by two slicers, one of which is referred to as a data slicer, and the other being referred to as a monitor slicer. Concurrent decisions made by the two slicers are used to adapt all the coefficients and various stages of gain in the present invention.

DETAILED DESCRIPTION OF THE INVENTION

In the context of an exemplary 10 Gb/s integrated circuit-type Serializer/Deserializer (SerDes), reference is made to the accompanying drawings, which form a part of the specific embodiment in which the invention may be practiced. It is to be understood that other embodiments may be utilized as structural changes may be made without departing from the scope of the present invention.

Figures 2, 2A:
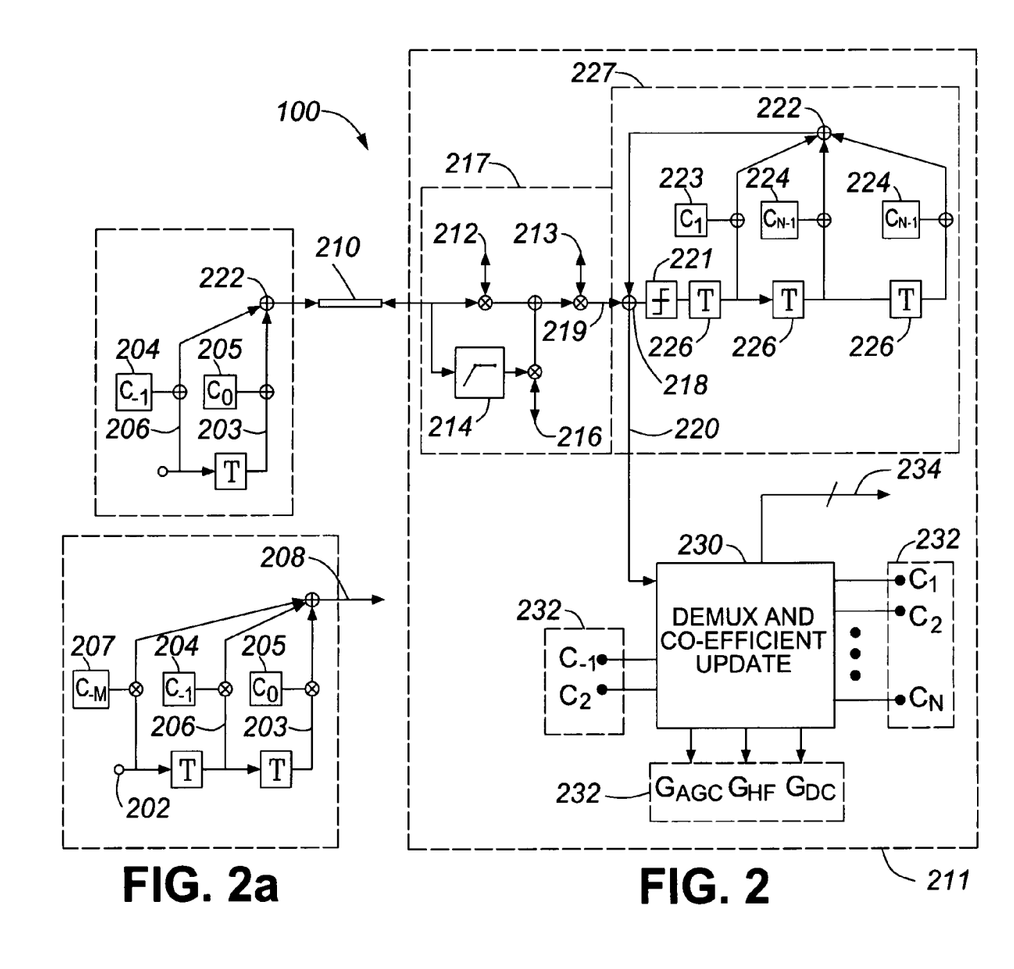
FIG. 2 illustrates a detailed block diagram of the Serializer/Deserializer system in accordance with the present invention.
FIG. 2a is a functional block diagram illustrating a variation of a transmit equalizer from that shown in FIG. 2.

FIG. 2 illustrates a block diagram of the channel equalization apparatus in accordance with the present invention. The system 200 comprises a transmitter driver 201 having an adaptive transmit equalizer and a receiver block 211, with an adaptive equalizer 217, which are used in conjunction to equalize the communication channel 210.

The adaptive transmit (TX) equalizer of the transmitter driver 201 has a symbol spaced feed forward equalizer that is a two (2) coefficient Finite Impulse Response (FIR) filter that filters the outgoing serial data stream 202 based on transmit control parameters to produce a launch data stream 208. The outgoing serial data stream 202 is filtered by summing the cursor, where the cursor represents the data bit being sent 203, with a portion of the pre-cursor, where the pre-cursor represents the data bit that is to be sent next 206. The transmit control parameters are provided by coefficients $C_{-1}$ 204 and $C_0$ 205, which define the proportion of each data bit that is summed to produce the launch data stream 208 that is sent into the communication channel 210. The values of the coefficients $C_{-1}$ 204 and $C_0$ 205 are controlled, configured or set by an adaptive algorithm 316 (see FIG. 3), which is described further with reference to FIG. 4.

One technique used to observe channel distortions of a signal launched into a communications channel is to overlay successive symbol(s) length segments of the received signal to produce a trace referred to as an eye trace. The eye trace provides a visual indication of various signal distortions. For example, low signal strength is represented by a partially closed eye, DC offset is represented by a vertical shift upwardly or downwardly of the center of the eye, intersymbol interference is represented by vertical variations in signal trace, jitter is represented by horizontal variations in signal trace and other distortions can be discerned from the eye trace as well. To observe the effects of signal conditioning and channel equalization intended to reduce the signal impairments caused by the communications channel, the eye trace is produced from the conditioned or equalized received signal. When the actual conditioned or equalized received signal deviates from the desired signal, a signal error occurs, which is the difference between a desired signal level and the actual signal level at the sampling instant. The signal error can be used to vary the signal conditioning or equalization to reduce or maintain the signal error to a minimum.

An adaptive linear equalizer 217 in the receiver block 211 has four (4) major components, namely three programmable gain amplifiers (PGA) 212, 216, 213 and a high-pass filter 214. The combination of the high-pass filter 214 and the programmable gain amplifiers 212, which is gain controlled by $G_{DC}$ and 216, which is gain controlled by $G_{HF}$, form a linear equalizer that can attenuate lower frequency components and amplify higher frequency components. This function is used to partially counteract the loss effects of the channel and reduce the number of coefficients that are required in the DFE 227 to equalize the channel. The linear equalizer also serves to reduce the gain of the first co-efficient value $C_1$ 223 of the DFE 227, which in turn reduces the probability of a burst error. The third programmable gain amplifier 213, which is gain controlled by $G_{AGC}$, is used in combination with the coefficient $C_0$ 205 to set the amplitude of the partially equalized eye, as well as allow the DFE 227 to function properly. Since the DFE 227 only works on decisions, it cannot properly handle all data combinations without the programmable gain control amplifier 213 operating at a suitable gain as controlled by the $G_{AGC}$ gain control. The $G_{DC}$ gain control is set to a discrete value that is anywhere between 0.1 and 1.0. The DEMUX and Coefficient update block controller 230 automatically sets and also automatically updates the values of the $G_{HF}$ and $G_{AGC}$ gain controls. The partially equalized amplitude adjusted output 219 of the analog equalizer 217 is used as an input to the summing node 218.

The DFE 227 in FIG. 2 is realized with a Finite-Impulse Response (FIR) filter, which has N symbol-spaced coefficients $[C_1:C_N]$, with a first co-efficient $C_1$ 223 and (N−1) subsequent coefficients 224. The decisions made by data slicer 221 are passed through the FIR filter, where the individual contribution of each co-efficient is summed at the summing node 222. The output of summing node 222 is fed back to another summing node 218, where the total contribution 222 of the FIR is added in a discrete-time fashion every data bit period T 226, to the incoming analog signal 219 produced by the linear equalizer. The total sum signal 220 represents the equalized serial data stream, which is used as an input to the DFE data slicer 221 as well as the signal that is passed on to the DEMUX and Coefficient update block controller 230. The Demux, and Coefficient Update block controller 230 takes in the equalized serial data stream 220, which it uses to produce the de-multiplexed user data 234 output and to produce the updated co-efficient data 232, namely, $C_{-1}$, $C_0$, $G_{AGC}$, $G_{HF}$, $G_{DF}$ and $C_1 \ldots C_N$.

FIG. 2a is a functional block diagram illustrating a variation of the transmit driver 201 that contains an M coefficient FIR filter to filter the outgoing serial data stream 202. The FIR filter of FIG. 2a filters the outgoing serial data stream 202 based on transmit control parameters $C_{-M}$ 207 … $C_{-1}$ 204 to $C_0$ 205 to which are summed to produce a launch data stream 208. The outgoing serial data stream 202 is filtered by summing the cursor, where the cursor represents the data bit being sent 203, with a portion of the pre-cursor, where the pre-cursor represents the data bit that is to be sent next 206 and also with portions of each of the successively earlier pre-cursors, where each pre-cursor is the next earlier data bit that is to be sent, up to an Mth earlier pre-cursor data bit. The transmit control parameters are provided by coefficients $C_{-M}$ 207 … $C_{-1}$ 204 and $C_0$ 205, which define the proportion of each data bit that is summed to produce the launch data stream 208 that is sent into the communication channel 210. The values of the coefficients $C_{-M}$ 207 … $C_{-1}$ 204 and $C_0$ 205 are controlled, configured or set by an adaptive algorithm 316 (see FIG. 3), which is described further with reference to FIG. 4.

Figure 3:
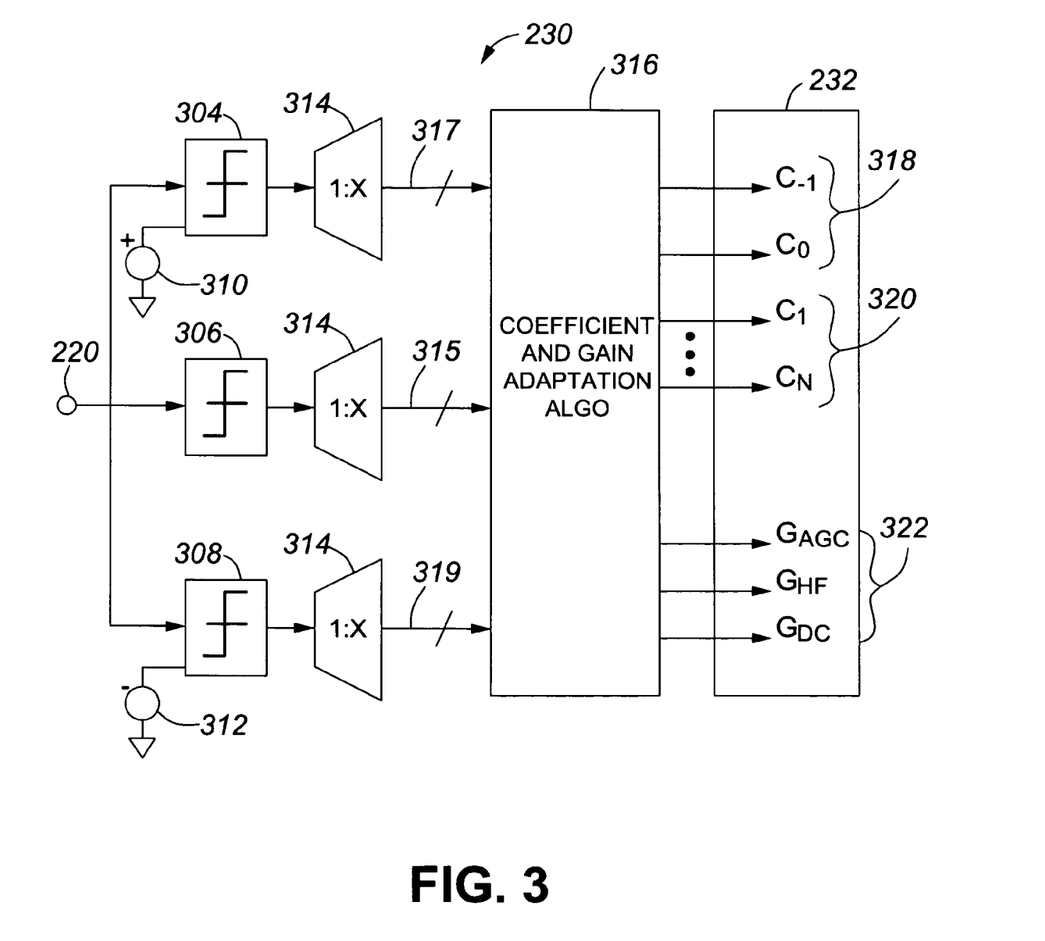
FIG. 3 illustrates a detailed block diagram of the Coefficient+Gain Update block.

FIG. 3 shows a more detailed functional block diagram of an embodiment of the Demux and Coefficient Update block controller 230. Three (3) slicers 304, 306 and 308 slice the input equalized serial data stream 220. Monitor slicers 304 and 308 are configured to sample data with a positive voltage offset 310 and negative voltage offset 312, respectively. Data slicer 306 is configured to sample data with a zero voltage offset. The corresponding decisions or slicer outputs are de-multiplexed by respective demultiplexers 314 into three parallel data streams, namely a user data stream 315, and two monitor streams 317 and 319 that correspond to slicer decisions made by 306, 304, and 308 respectively. All three parallel data streams are fed into the Coefficient and Gain Adaptation Algorithm block 316. The algorithm defined in FIG. 4 uses the three (3) sets of data words to update the coefficients and gains 232 that are used in the equalizer circuit as described in more detail with reference to FIG. 2.

Figure 4:
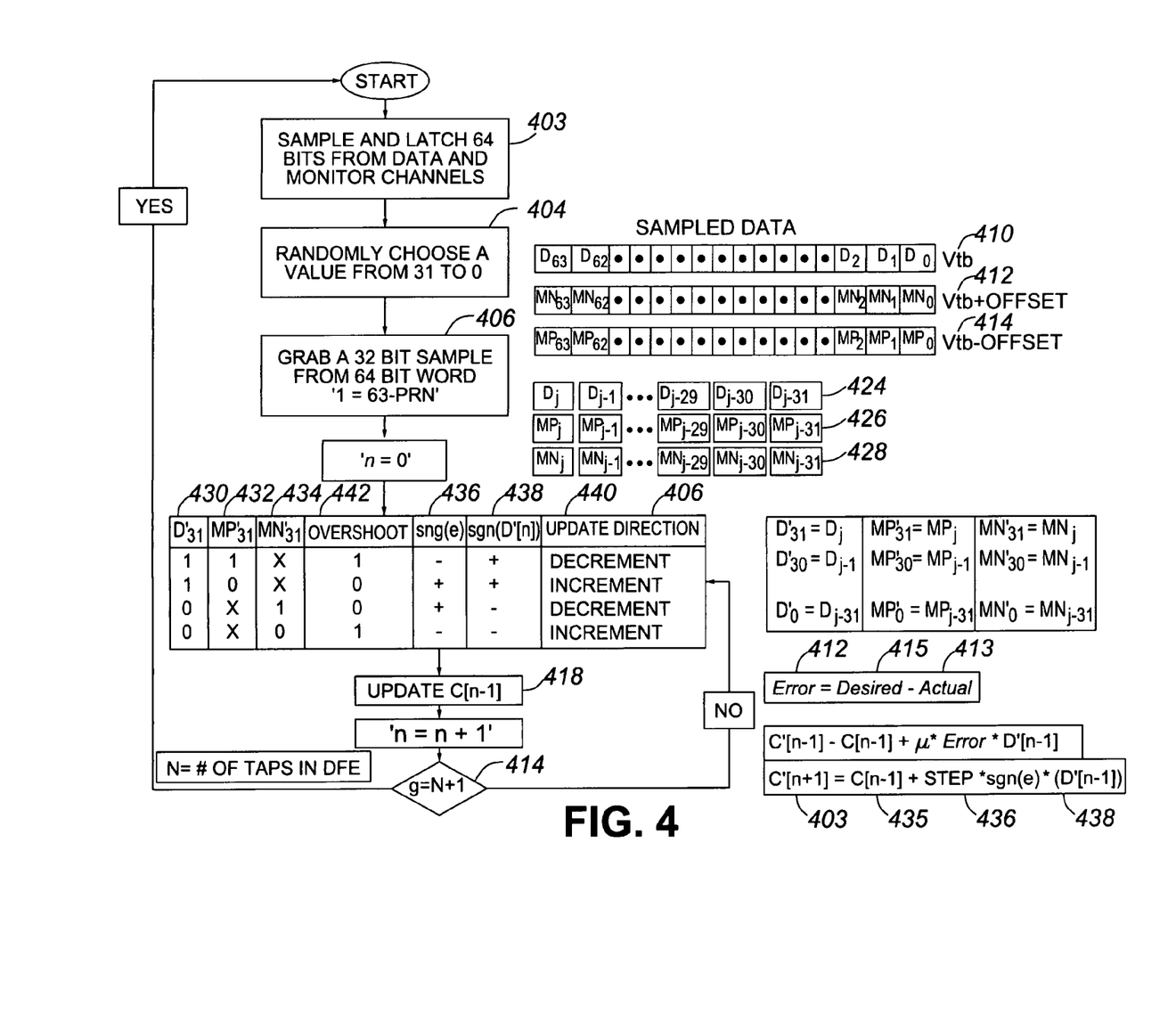
FIG. 4 outlines a top-level flow description of the Coefficient+Gain Adaptive Algorithm.

FIG. 4 is a flow diagram that shows the update algorithm that is used to adapt the various gains and coefficients used in the equalizer circuit as previously described. For this discussion, it is assumed that the de-multiplexing ratio of 1:N, where N=32. At the first step 402, three sets of two consecutive words are latched so that a total of three sets of 64 consecutive bits are stored in the word memory as sampled data. One set of words $D_{63}$–$D_0$ is latched as the data channel 416, which is obtained from slicer 306. Note that a bit with a smaller index than another one indicates that the former bit has been detected before the latter one. For example, $D_0$ has been detected before $D_1$, $D_1$ before $D_2$, and so on. Another set, $MP_{63}$–$MP_0$, is latched as the positive monitor channel 418, which is obtained from the monitor channel slicer 304 with a positive DC offset 310, and the third set of words, $MN_{63}$–$MN_0$, is latched as the negative monitor channel 420, which obtained from the monitor channel slicer 308 with a negative DC offset 312. The index order of MP and MN is the same as explained with the word D.

In the next step 404, a pseudo-random number between zero (0) and thirty-one (31) is generated and used as a bit offset in step 406. The bit offset 422, denoted PRN, is used to extract a thirty-two (32) bit word 424, $D'_j$–$D'_{j-31}$, from the data channel, 426, $MP'_j$–$MP'_{j-31}$, from monitor channel one, and 428, $MN'_j$–$MN'_{j-31}$, from monitor channel two, where in all cases $0 \leq j \leq 31$. The cursor index value is always defined by $j=31-M$, where M is the number of pre-cursor co-efficients in the transmitter. In the sequel, the index $j=31-M$ refers to the cursor, $j=31-M+1$ refers to the first pre-cursor, $j=31-M-1$ refers to the first post-cursor, and do on until $j=31$ for the most significant pre-cursor and $j=31-M-N$ for the last post-cursor. The window of data is varied in a pseudo-random manner so that the convergence is more robust against periodic harmonics or beats that would have the same frequency as the core system clock. This is a method of ensuring that the Bit Error Rate BER of the system is not deteriorated by a poor convergence solution that is caused by a power supply ripple or a periodic offset related to the core clock.

The co-efficient and gain updates are based on an approximation of the Least Mean Squares (LMS) criterion, which is defined by equation 401. Because all of the post processing of the data is based on hard decisions, it is necessary to use an approximation 403 of the equation 401, where the precise analog value of the Error 412 is replaced by the sign of the error 436, and the precise analog value of the Actual 413 is replaced by the sign of the signal components 438.

The truth table 408 is used to increment or decrement individual gains and coefficients 440. By selecting $D'_{31-M}$ 430 as the cursor information, $MP_{31-M}$ 432 and $MN_{31-M}$ 434 can be used to determine if the signal was an overshoot 442, which would represent a signal above or below the optimum threshold level, which is defined by the voltage offsets 310 and 312 of the monitor slicers 304 and 308 respectively. If the overshoot polarity 442 is the same as the cursor polarity 430, then the sign of the error is negative, otherwise it is positive. Once the sign of the error 436 is determined, it will be used in conjunction with the polarities 438 of the data bits in the vector 424 to update the coefficients and gains in the correct direction.

In step 410, the coefficients and gain taps are incremented or decremented by one step based on the direction imposed by the truth table 408. The cursor bit $D'_{31-M}$ is used to update $C_0$, the pre-cursor bit $D_{31-M+1}$ is used to update the pre-cursor co-efficient $C_{-1}$, and so on for the transmitter. For the receiver portions of the equalizer, the cursor bit $D'_{31-M}$ is also used to update the gain $G_{AGC}$, while the post-cursor bit $D_{31-M-1}$ is used to update $C_1$ and $G_{HF}$, where $G_{HF}$ is always updated in the opposite direction of $C_1$, and $D_{31-M-2}$–$D_{31-M-N}$ are used to update the rest of the DFE coefficients. The increment step 435 is chosen to be small, so that convergence is robust and co-efficient wandering is sufficiently small.

Figure 5:
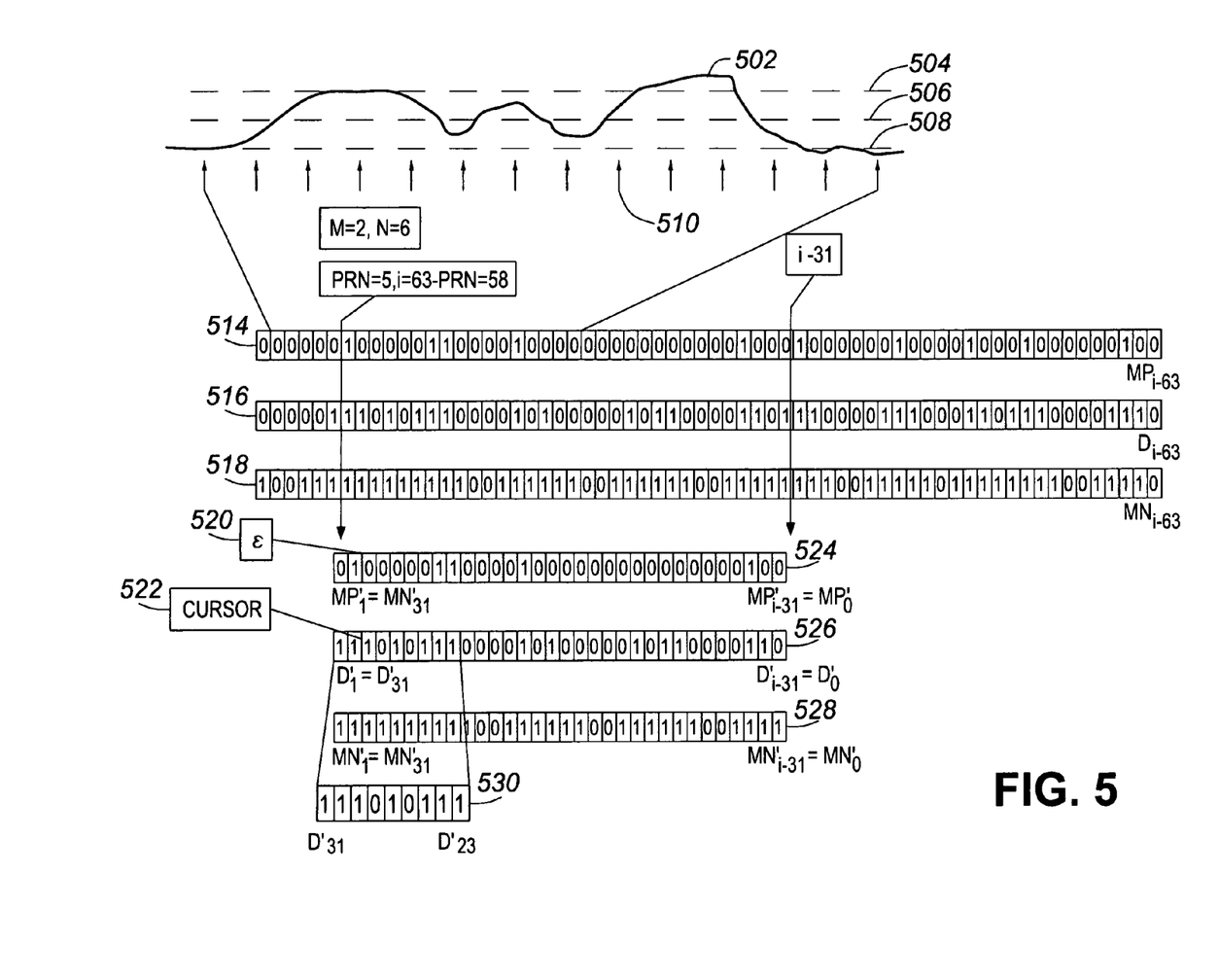
FIG. 5 illustrates how a bit-stream is used to obtain co-efficient and gain update criteria

The following is an example of one loop of the co-efficient and gain update process. The exemplary system is configured to have M=2 pre-cursor coefficients in the transmitter and N=6 post-cursor coefficients in the receiver's FIR filter. FIG. 5 shows an example of how a continuous binary bit-stream is used to generate update co-efficient and gains. The continuous serial bit-stream 502 is depicted as it would appear at the summing node 222. The bit-stream is binary, and is shown in relation to time, where the slicer thresholds 504, 506, and 508 represent the thresholds of the data slicers 306, 304 and 308 respectively, and are sampling the signal simultaneously at every instance of the periodic clock edge 510. It should be noted that the 64-bit words D 514, MP 516, and MN 518 are simply storing a string of comparisons in memory, where at each clock edge 510, the signal amplitude is compared to the respective slicer decision threshold; a "1" is stored if the signal amplitude is larger than the threshold, and a "0" is stored otherwise.

Once the 64-bit words are obtained, PRN 406 is generated based on the constraints outlined earlier. PRN is then used to generate the index i, which in turn is used to delineate the 32-bit word boundaries. In the present example PRN=5, and i=58, where i is used to extract the 32-bit words D' 524, MP' 526, and MN' 528. Once the 32-bit words D', MP', and MN' have been obtained, the next step is extract the vector 530 that contains the data bits required to update all the co-efficient and gain values. The vector is defined by the range $[D'_{31}, D'_{31-1}, \ldots D'_{31-M-1}, D'_{31-M-N}]$. $D'_{29}$ defines the cursor 522 automatically. In the present example, the cursor value is defined as $D'_{29}=1$.

Once the cursor bit value is obtained, the next step is to obtain the value $\epsilon$ 520, which will be used to indicate if the signal was greater than or less than the desired signal amplitude. The polarity of the cursor 522 is observed to determine if $MP'_{29}$ or $MN'_{29}$ should be used as $\epsilon$. In this example, since $D'_{29}=1$, the bit $MP'_{29}$ is kept, and all the other monitor bits, including those in the word MN', are discarded. $MP'_{29}=0$ means that the signal was below the positive monitor threshold 504 at the time the cursor was sampled. The sign of the "e" must be determined according to the truth table 430, and in this example is sgn($\epsilon$)="+".

The next step involves obtaining the data bits required to update the specific coefficients and gains in the equalization system. The truth table 430 is then used to determine the sgn($D_j'$) values for j=[−31 . . . 23)], which for this example results in the following assignments:

sgn($D_{31}'$)="+"
sgn($D_{30}'$)="+"
sgn($D_{29}'$)="+"
sgn($D_{28}'$)="−"
sgn($D_{27}'$)="+"
sgn($D_{26}'$)="−"
sgn($D_{25}'$)="+"
sgn($D_{24}'$)="+"
sgn($D_{23}'$)="+"

At this point, all the necessary information to perform a complete update of the equalization system has been obtained. By applying the criteria defined in the truth table 430, the following updates are made in the transmitter:

increment($C_{-2}$),
increment($C_{-1}$),
increment($C_0$),

The following updates are made to the DFE co-efficients in the receiver:

decrement($C_1$),
increment($C_2$),
decrement($C_3$),
increment($C_4$),
increment($C_5$),
increment($C_6$), And finally, the following updates are made to the gains in the linear filter in the receiver:

increment($G_{AGC}$), increment($G_{HF}$).

Once the co-efficients and gains are updated, the whole cycle will begin again with a new set of 64-bit words.

While the particular embodiments of the invention have been described with reference to the drawings, the scope of the invention is not limited to the particular embodiments so described but rather the scope of the invention is as defined in the claims appended hereto.

We claim:

1. An equalization apparatus for automatically equalizing serial communication over a communication channel comprising:
   i) an adaptive transmit equalizer to receive an outgoing serial data stream and provide launch data into the communication channel, the launch data equalized in response to transmit control parameters;
   ii) an adaptive receive equalizer to receive an incoming data stream from the communication channel and condition the received incoming data stream to produce an equalized output serial data stream in response to receive control parameters; and
   iii) control means operable to control said adaptive transmit equalizer and said adaptive receive equalizer based on said incoming data stream;
   wherein the adaptive receive equalizer includes an adaptive linear equalizer in combination with an adaptive non-linear decision feedback equalizer (DFE) to condition the received incoming data into said equalized output serial data stream; and
   wherein the control means includes a data slicer providing input to a data demultiplexer, a positive offset monitor slicer providing input to a positive monitor demultiplexer and a negative offset monitor slicer providing input to a negative monitor demultiplexer, each slicer coupled to said equalized output serial data stream wherein the demultiplexers provide inputs for producing said transmit control parameters and said receive control parameters.

2. The apparatus of claim 1, wherein the adaptive transmit equalizer has a symbol spaced feed forward equalizer with two taps corresponding to a cursor and pre-cursor.

3. The apparatus of claim 1, wherein the adaptive transmit equalizer has a two co-efficient Finite Impulse Response (FIR) filter symbol spaced feed forward equalizer with two taps corresponding to a cursor and pre-cursor the output of which is the launch data.

4. The apparatus of claim 1, wherein the adaptive transmit equalizer has a symbol spaced feed forward equalizer with a tap corresponding to a cursor and M pre-cursor taps.

5. The apparatus of claim 1, wherein the adaptive transmit equalizer has an M co-efficient Finite Impulse Response VA) filter that sums a portion of a cursor and the output of a symbol spaced feed forward equalizer with M taps, each tap corresponding to a successively earlier pre-cursor up to an Mth pre-cursor to produce the launch data.

6. The apparatus of claim 1, wherein said linear equalizer includes two distinct signal paths to condition the received incoming data, one signal path is a controllable pure gain stage and the other signal path is independently controllable pure gain stage coupled to a high-pass filter, the combined output of both is gain adjusted and supplied to said adaptive non-linear decision feedback equalizer (DFE).

7. The apparatus of claim 1, wherein said DFE has a plurality of symbol spaced taps, each of which can be programmed independently.

8. The apparatus of claim 1, wherein the control means includes a data word to store data channel bits, a positive monitor word to store positive monitor channel bits and a negative monitor word to store negative monitor channel bits, each said word stores bits responsive to the output of a respective slicer coupled to said equalized output serial data stream wherein said transmit control parameters and receive control parameters are determined by the bit values.

9. The apparatus of claim 1, wherein the control means includes a data word to store data channel bits, a positive monitor word to store positive monitor channel bits and a negative monitor word to store negative monitor channel bits, each said word stores bits responsive to the output of a respective slicer coupled to said equalized output serial data stream and a bit offset generator to define a window of data wherein said transmit control parameters and receive control parameters are determined by the bit values in said window of data.

10. The apparatus of claim 1, wherein the control means includes a data word to store data channel bits, a positive monitor word to store positive monitor channel bits and a negative monitor word to store negative monitor channel bits, each said word stores bits responsive to the output of a respective slicer coupled to said equalized output serial data stream and a pseudo random bit offset generator to define a window of data wherein said transmit control parameters and receive control parameters are determined by the bit values in said window of data.

11. An equalization apparatus for automatically equalizing serial communication over a communication channel comprising:
   i) an adaptive transmit equalizer including a symbol spaced feed forward equalizer with a first tap to condition a cursor symbol corresponding to a tap parameter $C_0$ and M additional taps to condition each successively earlier pre-cursor symbol corresponding to a respective tap parameter $C_{-M} \ldots C_{-1}$ to receive an outgoing serial data stream and output launch data into the communication channel;
   ii) an adaptive receive equalizer to receive an incoming data stream from the communication channel including:
      a controllable filter including a high-pass filter coupled to a controllable pure gain stage to condition the received incoming data stream corresponding to a gain parameter $G_{HF}$;
      a summing node to sum the output of said controllable filter with the received incoming data stream that is gain adjusted corresponding to a gain parameter $G_{DC}$;
      a controllable pure gain stage coupled to the output of said summing node to provide an output at a gain corresponding to a gain parameter $G_{AGC}$;
      an N tap adaptive non-linear decision feedback equalizer (DFE) coupled to the output of the $G_{AGC}$ stage providing N symbol spaced taps, each of which can be programmed independently corresponding to a respective tap parameter $C_1, C_2 \ldots C_N$; and
   iii) a demux and tap update block controller coupled to the output of said adaptive receive equalizer to produce said gain and tap parameters $G_{HF}$, $G_{AGC}$ and $C_{-1}, C_0 \ldots C_N$.

12. The apparatus of claim 11 wherein said demux and tap update block controller further includes a data slicer, a positive offset monitor slicer and a negative offset monitor slicer each coupled to the output of said adaptive receiver.

13. The apparatus of claim 11 wherein said demux and tap update block controller includes a data slicer providing input to a data demultiplexer, a positive offset monitor slicer providing input to a positive monitor demultiplexer and a negative offset monitor slicer providing input to a negative monitor demultiplexer, each slicer coupled to said equalized output serial data stream wherein the demultiplexers provide inputs for producing said gain and tap parameters.

14. The apparatus of claim 11 wherein said demux and tap update block controller includes a data slicer providing input to a data demultiplexer, a positive offset monitor slicer providing input to a positive monitor demultiplexer and a negative offset monitor slicer providing input to a negative monitor demultiplexer, each slicer coupled to said equalized output serial data stream and a bit offset generator to define a window of data in said data demultiplexer, said positive monitor demultiplexer and said negative monitor demultiplexer wherein said gain and tap parameters are determined by the bit values in said window of data.

15. The apparatus of claim 11 wherein said demux and tap update block controller includes a data slicer providing input to a data demultiplexer, a positive offset monitor slicer providing input to a positive monitor demultiplexer and a negative offset monitor slicer providing input to a negative monitor demultiplexer, each slicer coupled to said equalized output serial data stream and a pseudo random bit offset generator to define a window of data in said data demultiplexer, said positive monitor demultiplexer and said negative monitor demultiplexer wherein said gain and tap parameters are determined by the bit values in said window of data.

16. The apparatus of claim 11 wherein said demux and tap update block controller includes a data word to store data channel bits, a positive monitor word to store positive monitor channel bits and a negative monitor word to store negative monitor channel bits, each said word stores bits responsive to the output of a respective slicer coupled to said equalized output serial data stream and a bit offset generator to define a window of data in said data word, said positive monitor word and said negative monitor word wherein said gain and tap parameters are determined by the bit values.

17. The apparatus of claim 11 wherein said demux and tap update block controller includes a data word to store data channel bits, a positive monitor word to store positive monitor channel bits and a negative monitor word to store negative monitor channel bits, each said word stores bits responsive to the output of a respective slicer coupled to said equalized output serial data stream and a pseudo random bit offset generator to define a window of data in said data word, said positive monitor word and said negative monitor word wherein said gain and tap parameters are determined by the bit values.

18. A method for automatically equalizing serial communication over a communication channel comprising the steps of:
i) using an M tap feed forward equalizer to shape an outgoing data stream into a launch data stream based on a respective pre-cursor symbol tap parameter $C_{-M} \ldots C_{-1}$ and a symbol tap parameter $C_0$;
ii) supplying the launch data stream to the communication channel;
iii) receiving an incoming data stream from the communication channel;
iv) conditioning the received incoming data stream by passing the incoming data stream through an adaptive linear equalizer and an N Tap Decision Feedback Equalizer (DFE) with corresponding symbol spaced tap parameters $[C_{-M}:C_N]$ to produce an equalized serial data stream;
v) sampling the equalized serial data stream to latch user data;
vi) sampling the equalized serial data stream to latch monitor data; and
vii) producing the tap parameters $[C_{-M}:C_N]$ from the user data and monitor data;
further including a step of producing gain parameters $G_{DC}$, $G_{HF}$ and $G_{AGC}$ from the user data and monitor data, and wherein the step of conditioning the received incoming data stream by passing the incoming data stream through an adaptive linear equalizer includes:
i) supplying the incoming data stream to a first signal path through a high-pass filter coupled to a controllable pure gain stage at a gain corresponding to a gain parameter $G_{HF}$ and to a second signal path through a controllable pure gain stage coupled at a gain corresponding to a gain parameter $G_{DC}$;
ii) summing the outputs of said first and second signal paths; and
iii) supplying the said sum of the outputs to a controllable pure gain stage at a gain corresponding to a gain parameter $G_{AGC}$ to produce the input for said an N Tap Decision Feedback Equalizer (DFE).

19. The method of claim 18 further including the steps of:
i) over a plurality of symbol periods:
storing the latched user data in a data channel word;
storing the latched monitor data in a monitor channel word; and
ii) producing the symbol spaced tap parameters from selected portions of said stored user data and said stored monitor data.

20. The method of claim 19 further including the step of generating a bit offset to define a window of data in said data channel word and said monitor channel word whereby the step of producing the symbol spaced tap parameters is based on said data window defining said selected portions of said stored user data and said stored monitor data determined by said bit offset.

21. The method of claim 20 wherein a pseudo random bit offset is generated each time said symbol spaced tap parameters are produced.

* * * * *

UNITED STATES PATENT AND TRADEMARK OFFICE
CERTIFICATE OF CORRECTION

PATENT NO. : 7,940,839 B2
APPLICATION NO. : 10/597455
DATED : May 10, 2011
INVENTOR(S) : Marcel Lapointe It is certified that error appears in the above-identified patent and that said Letters Patent is hereby corrected as shown below:

Column 9, line 56, After Finite Impulse Response "VA)" is corrected to read as --(FIR)--

Signed and Sealed this
Fifth Day of July, 2011

David J. Kappos
*Director of the United States Patent and Trademark Office*